US008771395B2

(12) United States Patent
Raether

(10) Patent No.: US 8,771,395 B2
(45) Date of Patent: *Jul. 8, 2014

(54) FILTER CARTRIDGE WITH SEAL MEMBER AND METHODS

(71) Applicant: Donaldson Company, Inc., Minneapolis, MN (US)

(72) Inventor: Thomas Donald Raether, St. Louis Park, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/943,451

(22) Filed: Jul. 16, 2013

(65) Prior Publication Data

US 2013/0298770 A1 Nov. 14, 2013

Related U.S. Application Data

(63) Continuation of application No. 12/901,807, filed on Oct. 11, 2010, now Pat. No. 8,491,691.

(60) Provisional application No. 61/251,493, filed on Oct. 14, 2009, provisional application No. 61/334,665, filed on May 14, 2010, provisional application No. 61/360,659, filed on Jul. 1, 2010.

(51) Int. Cl.
*B01D 46/00* (2006.01)

(52) U.S. Cl.
USPC .................... 55/502; 55/357; 55/497; 55/521

(58) Field of Classification Search
USPC .................. 55/357, 484, 497, 502, 521, 529; 95/273
See application file for complete search history.

(56) References Cited

U.S. PATENT DOCUMENTS

| 3,789,589 | A | 2/1974 | Delany et al. |
| 4,373,635 | A | 2/1983 | Mules |
| 5,795,361 | A | 8/1998 | Lanier, Jr. et al. |
| 5,820,646 | A | 10/1998 | Gillingham et al. |
| 5,871,557 | A | 2/1999 | Tokar et al. |

(Continued)

FOREIGN PATENT DOCUMENTS

| EP | 0083169 | 7/1983 |
| EP | 1749562 | 2/2007 |

(Continued)

OTHER PUBLICATIONS

European Search Report mailed Jan. 27, 2011.

(Continued)

*Primary Examiner* — Robert Clemente
(74) *Attorney, Agent, or Firm* — Merchant & Gould P.C.

(57) ABSTRACT

An air filter cartridge has filter media and a gasket arrangement with a perimeter gasket member against the downstream flow face and a side gasket member adjacent to at least a partial extension of a first side panel. The side gasket member includes no portion against second, third, and fourth side panels of the air filter cartridge. The air filter cartridge can be used in a dust collector having a tubesheet and a frame arrangement extending from the tubesheet. The perimeter gasket member seals against the frame arrangement and the side gasket member seals against the tubesheet.

19 Claims, 12 Drawing Sheets

(56) References Cited

U.S. PATENT DOCUMENTS

| | | |
|---|---|---|
| 6,673,136 B2 | 1/2004 | Gillingham et al. |
| 7,338,544 B2 | 3/2008 | Sporre et al. |
| 7,674,308 B2 | 3/2010 | Krisko et al. |
| 8,491,691 B2 * | 7/2013 | Raether ................ 55/502 |
| 2002/0059868 A1 | 5/2002 | Gogins et al. |
| 2004/0187689 A1 | 9/2004 | Sporre et al. |
| 2005/0166559 A1 | 8/2005 | Gillingham et al. |
| 2007/0125052 A1 | 6/2007 | Holzmann et al. |
| 2008/0127825 A1 | 6/2008 | Raether |
| 2008/0127827 A1 | 6/2008 | Raether |
| 2011/0083408 A1 | 4/2011 | Raether et al. |

FOREIGN PATENT DOCUMENTS

| | | |
|---|---|---|
| WO | WO 91/19898 | 12/1991 |
| WO | WO 2008/045325 A2 | 4/2008 |
| WO | WO 2009/100119 A1 | 8/2009 |

OTHER PUBLICATIONS

Invitation to Pay Additional Fees with Partial International Search mailed Dec. 7, 2010.

* cited by examiner

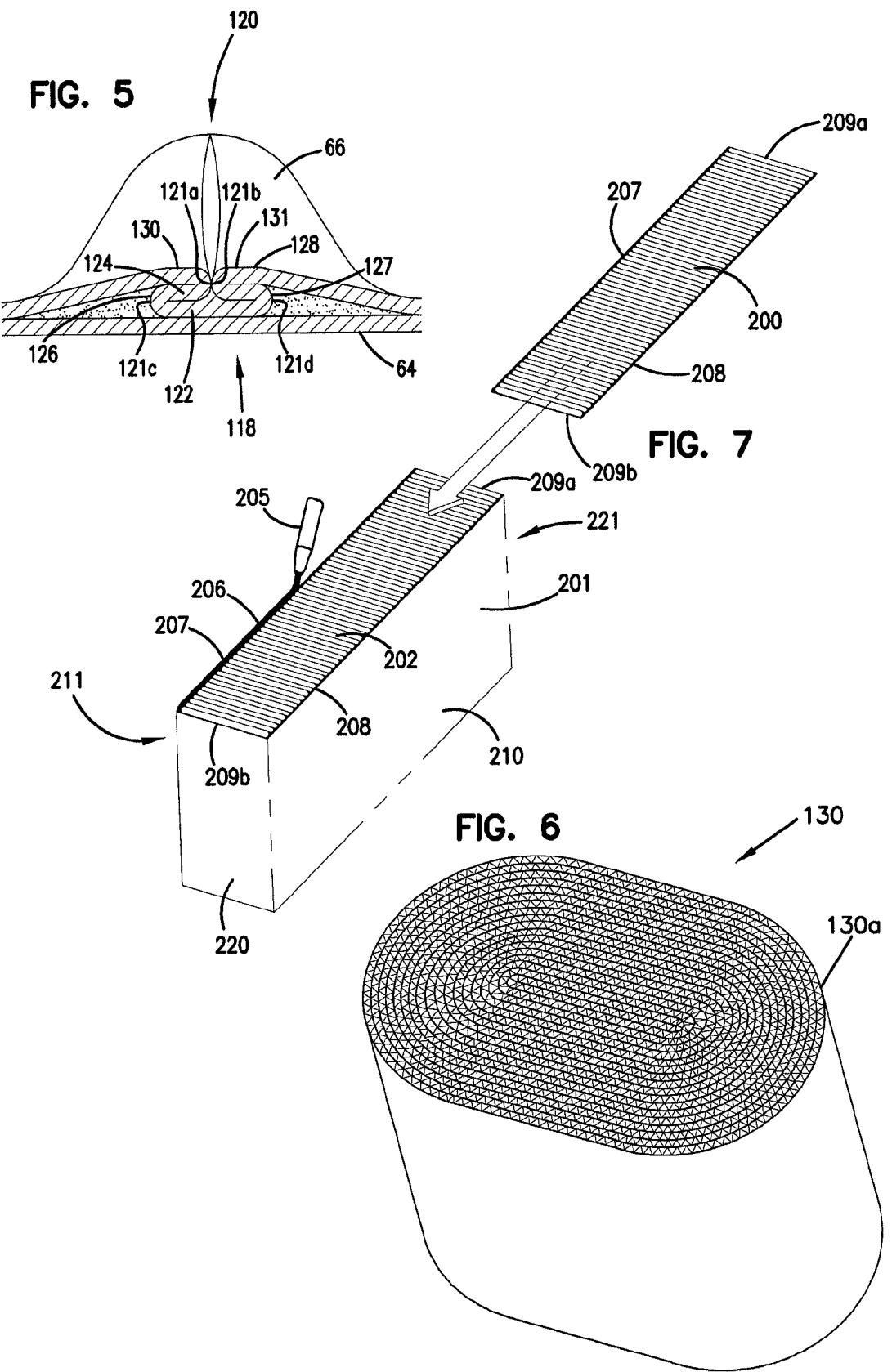

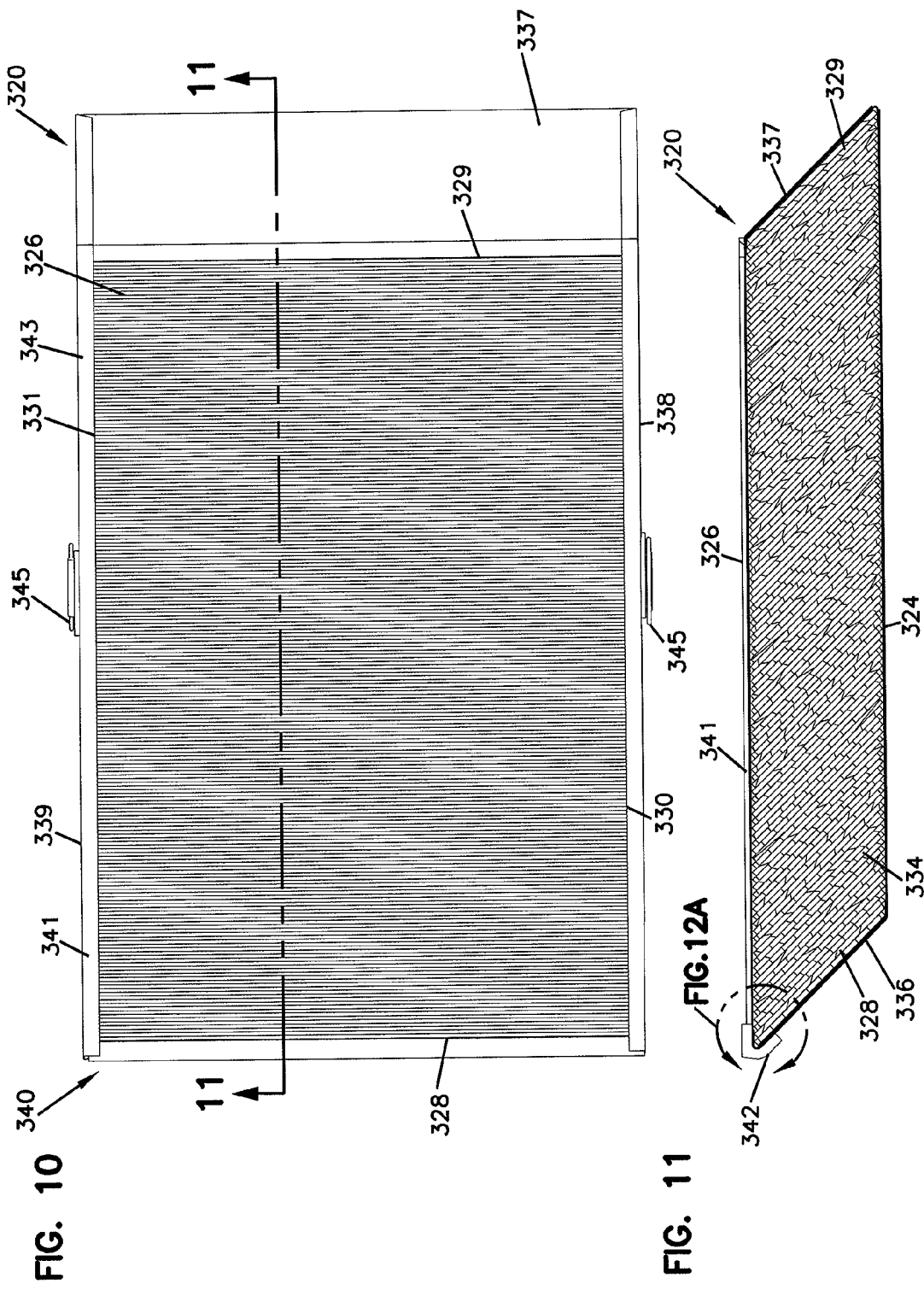

FILTER CARTRIDGE WITH SEAL MEMBER AND METHODS

This application is a continuation of application Ser. No. 12/901,807 filed Oct. 11, 2010, which application claims priority under 35 U.S.C. §119(e) to U.S. provisional patent applications 61/251,493 filed Oct. 14, 2009; 61/334,665 filed May 14, 2010; and 61/360,659 filed Jul. 1, 2010. The disclosures of each of these applications are incorporated herein by reference in their entireties.

TECHNICAL FIELD

This disclosure concerns filters for cleaning air, for example, for use in dust collectors and other equipment. In particular, this disclosure concerns z-filters having a wrap-around seal and dust collectors utilizing the z-filters and methods.

BACKGROUND

Dust collectors are used to clean particulate matter from air flow streams. One embodiment of dust collectors includes bag house filters. Bag house filters include a housing, a dirty air inlet, a clean air outlet, and a tubesheet having a plurality of apertures. The tubesheet separates the housing between a dirty air side and a clean air side and holds the filter bags. The bags are made of a filter media so that as dirty air flows from the dirty air side to the clean air side, the air must flow through the bags, and the filter media of the bags prevents particulate matter from reaching the clean air side.

Another embodiment of dust collectors that is known includes the use of filter cartridges having pleated media in the form of cylinders or ovals. The filter cartridges are held by a tubesheet, and the air must flow through the pleated media of the filter cartridges from the dirty air side to the clean air side. Improvements in dust collectors are desirable.

SUMMARY

In one aspect, an air filter cartridge is provided including a media pack having upstream and downstream opposite flow faces, first and second opposite sides extending between the upstream and downstream opposite flow faces. A first side panel is against the first side of the media pack. The gasket arrangement has a perimeter gasket member against the downstream flow face and around a perimeter of the downstream flow face. The gasket arrangement also includes a side gasket member, integral with the perimeter gasket member, and adjacent to at least a partial extension of the first side panel.

In another aspect, a method of filtering air includes directing dirty air into an unfiltered air plenum of a housing, the housing having a tubesheet and a frame arrangement. Next, there is the step of directing the dirty air through an upstream side of a media pack of a first air filter cartridge to remove contaminant from the dirty air and result in filtered air in the filtered air plenum. The media pack has upstream and downstream opposite flow faces. Next, there is the step of preventing dirty air from bypassing the first air filter cartridge by a gasket arrangement including a perimeter gasket member against the downstream flow face and around a perimeter of the downstream flow face, the perimeter gasket member being compressed against the frame arrangement. A side gasket member, integral with the perimeter gasket member, and adjacent to at least a partial extension of the first side panel is compressed against the tubesheet sealing surface.

In another aspect, a gasket for use with a filter cartridge includes a first gasket segment having a free end and an opposite first end; a second gasket segment having a free end and an opposite second end; the second gasket segment being angled relative to the first gasket segment at an angle of 20-70°; a ratio of a length of the first gasket segment to the second gasket segment being between 1-2.5; and an intermediate gasket segment joining the first end of the first gasket segment and the second end of the second gasket segment. The first gasket segment, second gasket segment, and intermediate gasket segment together define an open filter cartridge-receiving cavity constructed and arranged to receive a filter cartridge.

It is noted that not all these specific features described herein need to be incorporated in an arrangement for the arrangement to have some selected advantage according to the present disclosure.

BRIEF DESCRIPTION OF THE DRAWINGS

FIG. 5 is a schematic, cross-sectional view of an example of a darted fluted;

FIG. 6 is a schematic, perspective view of a coiled media construction comprising a coiled sheet of single facer media material;

FIG. 7 is a schematic, perspective view of a stacked media construction;

FIG. 10 is a top view of the air filter cartridge of FIG. 8;

FIG. 11 is a cross-sectional view of the air filter cartridge of FIG. 8, the cross-section being taken along the line 11-11 of FIG. 10;

DETAILED DESCRIPTION

Figure 1:
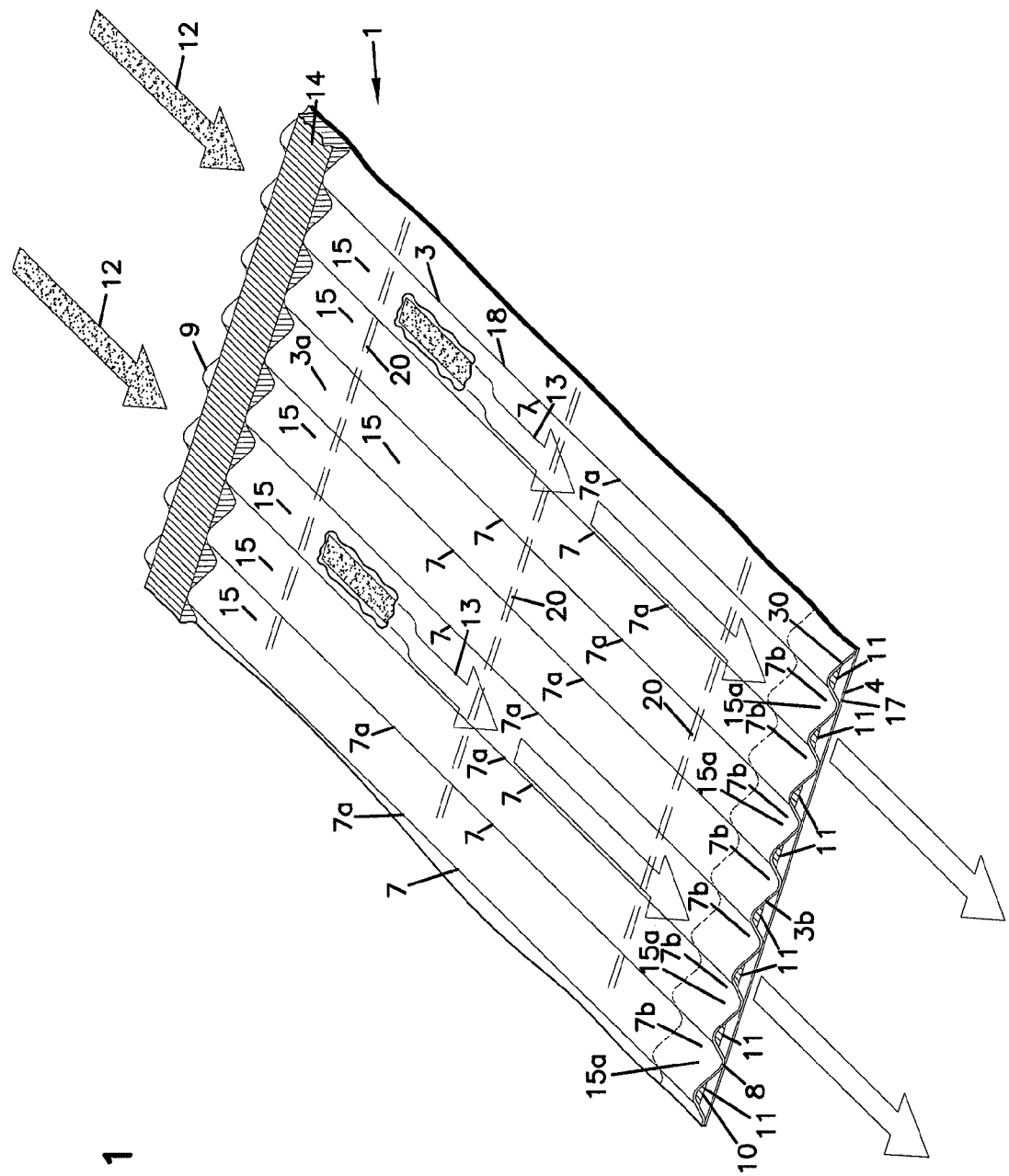
FIG. 1 is a fragmentary, schematic, perspective view of a single facer strip of z-filter media comprising a flutes sheet secured to a facing sheet.

I. Z-Filter Media Configurations, Generally.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal filter flutes for fluid flow through the media; the fluid flowing along the length of the flutes between opposite inlet and outlet flow ends (or flow faces) of the media.

One type of z-filter media utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet, together, are used to define media having parallel inlet and outlet flutes; i.e. opposite sides of the fluted sheet operable as inlet and outlet flow regions. In some instances, the fluted sheet and non-fluted sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of fluted media secured to flat media, are stacked on one another, to create a filter construction. An example of this is shown herein at FIG. 7.

Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, published Sep. 30, 2004 as WO 2004/082795. The resulting coiled arrangement generally has, as the outer surface of the media pack, a portion of the facing sheet, as a result. In some instances a protective covering can be provided around the media pack.

The term "corrugated" when used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques. Corrugated media is a specific form of fluted media. Fluted media is media which has individual flutes (for example formed by corrugating or folding) extending there across.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. (The term "straight through flow configuration" disregards, for this definition, any air flow that passes out of the media pack through the outermost wrap of facing media.) The term "serviceable" in this context is meant to refer to a media containing filter cartridge that is periodically removed and replaced from a corresponding air cleaner.

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems).

The term "z-filter media construction" and variants thereof as used herein, without more, is meant to refer to any or all of: a web of corrugated or otherwise fluted media secured to (facing) media with appropriate sealing to inhibit air flow from one flow face to another without filtering passage through the filter media; and/or, such a media coiled or otherwise constructed or formed into a three dimensional network of flutes; and/or, a filter construction including such media. In many arrangements, the z-filter media construction is configured for the formation of a network of inlet and outlet flutes, inlet flutes being open at a region adjacent an inlet face and being closed at a region adjacent an outlet face; and, outlet flutes being closed adjacent an inlet face and being open adjacent an outlet face. However, alternative z-filter media arrangements are possible, see for example US 2006/0091084 A1, published May 4, 2006; also comprising flutes extending between opposite flow faces, with a seal arrangement to prevent flow of unfiltered air through the media pack.

In FIG. 1 herein, an example of media 1 useable in z-filter media is shown. The media 1 is formed from a fluted (corrugated) sheet 3 and a facing sheet 4. Herein, a strip of media comprising fluted sheet secured to facing sheet will sometimes be referred to as a single facer strip, or by similar terms. In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction; an equal number of ridges and troughs are necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. Although alternatives are possible, a typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, curved, wave pattern corrugated sheet 3 shown in FIG. 1, is that the individual corrugations are generally straight. By "straight" in this context, it is meant that through at least 70% (typically at least 80%) of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible. In the example shown, adjacent edge 8 is provided sealant, in this instance in the form of a sealant bead 10, sealing the corrugated (fluted) sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

In the example shown, adjacent edge 9, is provided sealant, in this instance in the form of a seal bead 14. Seal bead 14 generally closes flutes 15 to passage of unfiltered fluid therein, adjacent edge 9. Bead 14 would typically be applied as the media 1 is coiled about itself, with the corrugated sheet 3 directed to the inside. Thus, bead 14 will form a seal between a back side 17 of facing sheet 4, and side 18 of the corrugated sheet 3. The bead 14 will sometimes be referred to as a "winding bead" since it is typically applied, as the strip 1 is coiled into a coiled media pack. If the media 1 is cut in strips and stacked, instead of coiled, bead 14 would be a "stacking bead."

Referring to FIG. 1, once the media 1 is incorporated into a media pack, for example by coiling or stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15a of the flutes 15, adjacent end 8 of the media pack. Of course operation could be conducted with air flow in the opposite direction.

In more general terms, z-filter media comprises fluted filter media secured to facing filter media, and configured in a media pack of flutes extending between first and second opposite flow faces. A sealant arrangement is provided within the media pack, to ensure that air entering flutes at a first upstream edge cannot exit the media pack from a downstream edge, without filtering passage through the media.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation (flute) shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use. In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet. The media of the corrugated sheet 3 facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media especially those which use straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Still referring to FIG. 1, at 20 tack beads are shown positioned between the corrugated sheet 3 and facing sheet 4, securing the two together. The tack beads can be for example, discontinuous lines of adhesive. The tack beads can also be points in which the media sheets are welded together.

From the above, it will be apparent that the corrugated sheet 3 is typically not secured continuously to the facing sheet, along the troughs or ridges where the two adjoin. Thus, air can flow between adjacent inlet flutes, and alternately between the adjacent outlet flutes, without passage through the media. However air which has entered in inlet flute cannot exit from an outlet flute, without passing through at least one sheet of media, with filtering.

Figure 2:
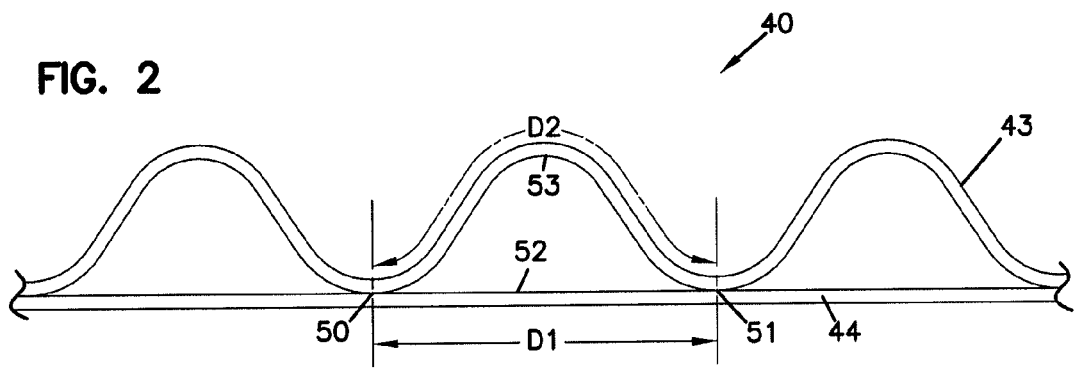
FIG. 2 is an enlarged, schematic, fragmentary view of a single facer sheet comprising fluted media secured to the facing media.

Attention is now directed to FIG. 2, in which a z-filter media construction 40 utilizing a fluted (in this instance regular, curved, wave pattern corrugated) sheet 43, and a non-corrugated flat, facing, sheet 44, is depicted. The distance D1, between points 50 and 51, defines the extension of flat media 44 in region 52 underneath a given corrugated flute 53. The length D2 of the arch-shaped media for the corrugated flute 53, over the same distance D1 is of course larger than D1, due to the shape of the corrugated flute 53. For a typical regular shaped media used in fluted filter applications, the linear length D2 of the media 53 between points 50 and 51 will generally be at least 1.2 times D1. Typically, D2 would be within a range of 1.2-2.0, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or media draw for the corrugated media.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

It is noted that alternative flute definitions such as those characterized in U.S. Ser. No. 12/215,718, filed Jun. 26, 2008; and Ser. No. 12/012,785, filed Feb. 4, 2008 can be used, with air cleaner features as characterized herein below.

Figure 3A:
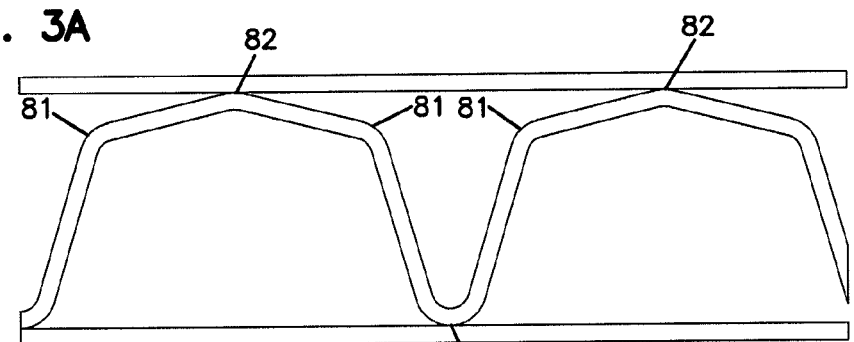
FIG. 3A is schematic, fragmentary, cross-sectional view of a further fluted media configuration in a single facer media pack.
Figure 3B:
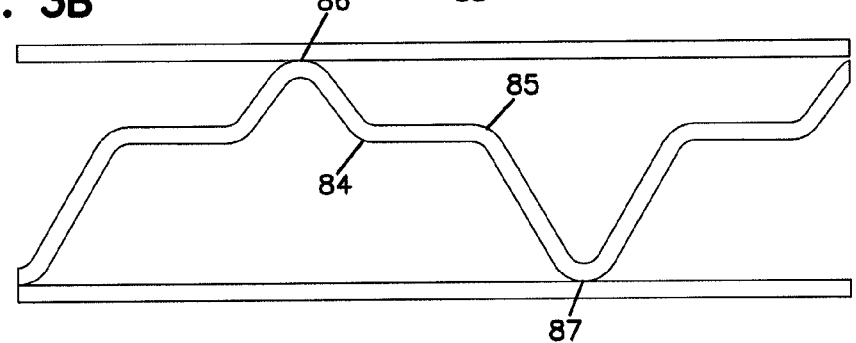
FIG. 3B is a schematic, fragmentary, cross-sectional view of a still further alternate flute definition.
Figure 3C:
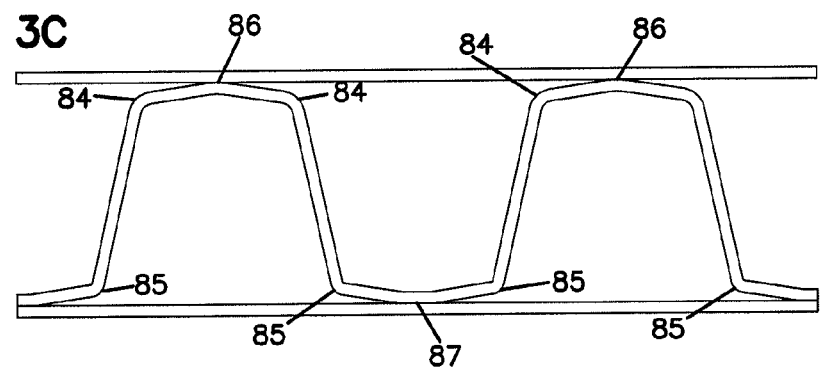
FIG. 3C is a schematic, fragmentary, cross-sectional view of yet another flute definition for a media pack.
Figure 3:
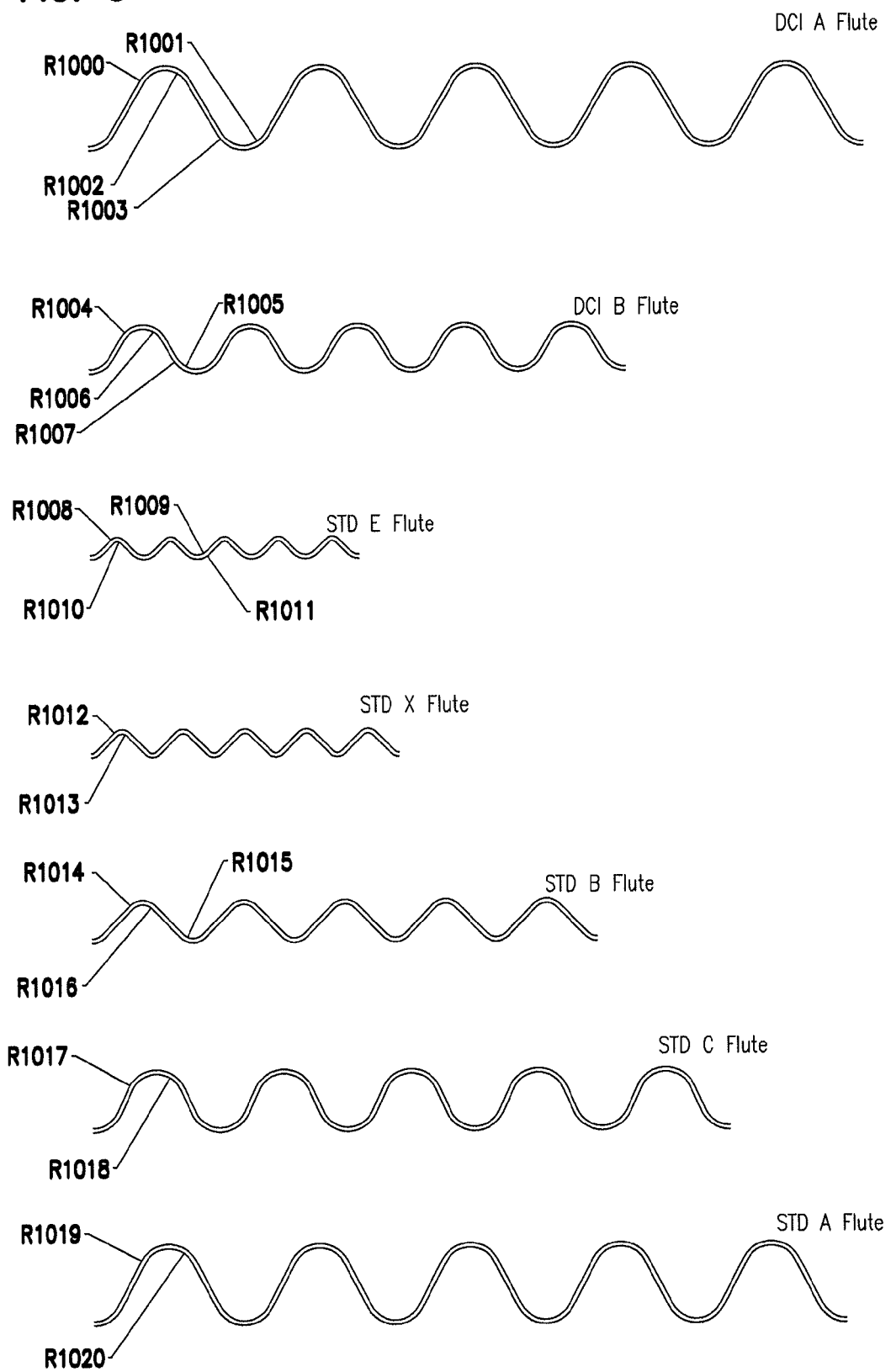
FIG. 3 is a schematic view of various selected flute shapes.

In FIGS. 3A-3C, cross-sectional views of exemplary portions of filtration media are shown wherein the fluted sheet has one or more non-peak ridge extending along at least a portion of the flute length. FIG. 3A shows a fluted sheet having one non-peak ridge 81 provided between adjacent peaks 82, 83, and FIGS. 3B and 3C show fluted sheets having two non-peak ridges 84, 85 between adjacent peaks 86, 87. The non-peak ridges 81, 84, 85 can extend along the flute length any amount including, for example, an amount of 20% of the flute length to 100% of the flute length. In addition, the fluted sheet can be provided without non-peak ridges 81, 84, 85 between all adjacent peaks 82, 83, 86, 87, and can be provided with differing numbers of non-peak ridges 81, 84, 85 between adjacent peaks 82, 83, 86, 87 (e.g., alternating zero, one, or two non-peak ridges in any arrangement). The presence of non-peak ridges 81, 84, 85 can help provide more media available for filtration in a given volume, and can help reduce stress on the fluted sheet thereby allowing for a smaller radius at the peaks and therefore reduced media masking. Such media can be used in arrangements according to the present disclosure.

II. Manufacture of Coiled Media Configurations Using Fluted Media, Generally.

Figure 4:
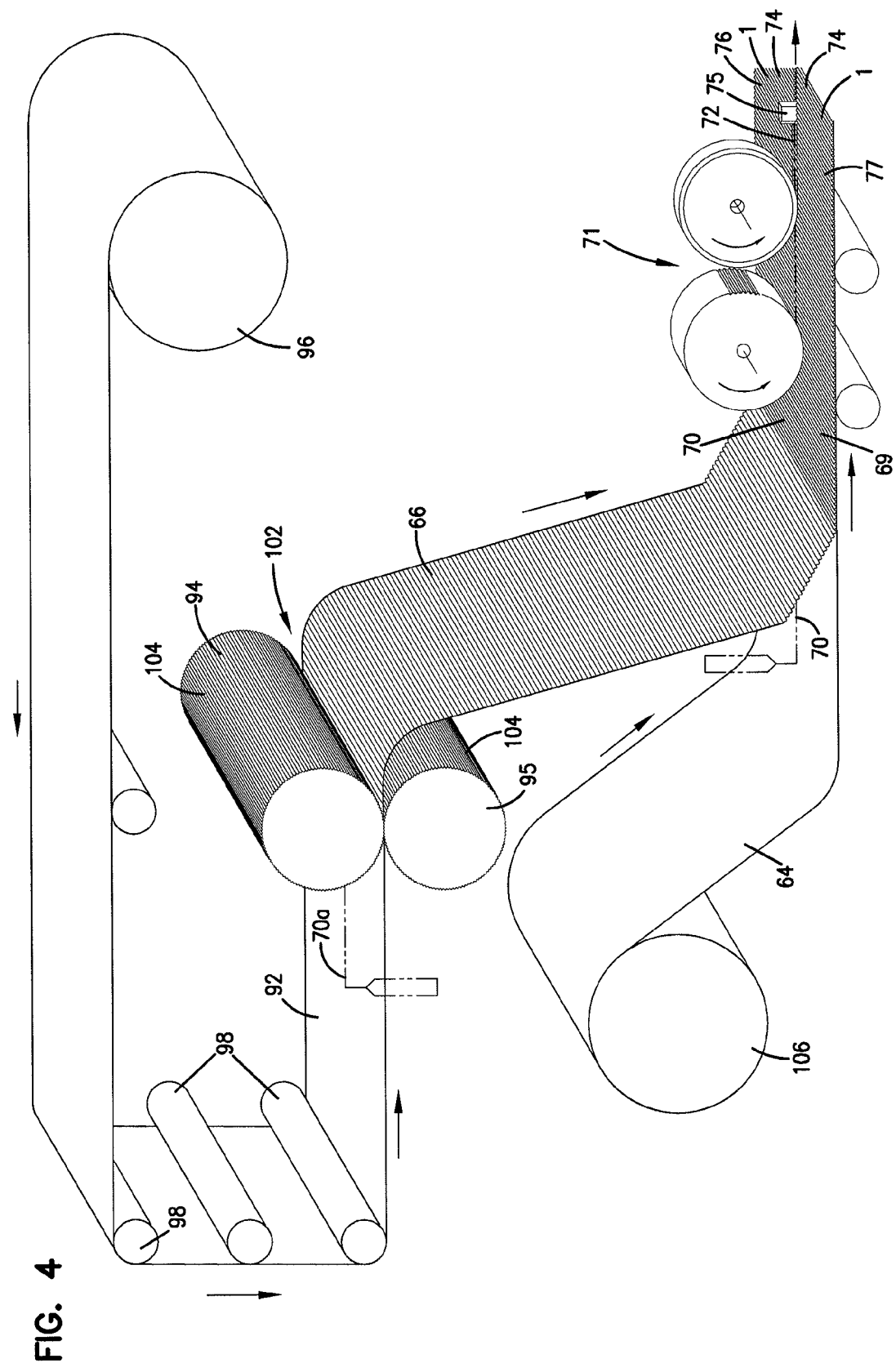
FIG. 4 is a schematic view of a process for making single facer media for use in a media pack according to the present disclosure.

In FIG. 4, one example of a manufacturing process for making a media strip (single facer) corresponding to strip 1, FIG. 1 is shown. In general, facing sheet 64 and the fluted (corrugated) sheet 66 having flutes 68 are brought together to form a media web 69, with an adhesive bead located there between at 70. The adhesive bead 70 will form a single facer bead 14, FIG. 1. The term "single facer bead" references a sealant bead positioned between layers of a single facer; i.e., between the fluted sheet and facing sheet.

An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location. The strips or pieces 76, 77 can then be cut across, into single facer strips for stacking, as described

TABLE A

| (Flute definitions for FIG. 3) | |
|---|---|
| DCI A Flute: | Flute/flat = 1.52:1; The Radii (R) are as follows:<br>R1000 = .0675 inch (1.715 mm); R1001 = .0581 inch (1.476 mm);<br>R1002 = .0575 inch (1.461 mm); R1003 = .0681 inch (1.730 mm); |
| DCI B Flute: | Flute/flat = 1.32:1; The Radii (R) are as follows:<br>R1004 = .0600 inch (1.524 mm); R1005 = .0520 inch (1.321 mm);<br>R1006 = .0500 inch (1.270 mm); R1007 = .0620 inch (1.575 mm); |
| Std. E Flute: | Flute/flat = 1.24:1; The Radii (R) are as follows:<br>R1008 = .0200 inch (.508 mm); R1009 = .0300 inch (.762 mm);<br>R1010 = .0100 inch (.254 mm); R1011 = .0400 inch (1.016 mm); |
| Std. X Flute: | Flute/flat = 1.29:1; The Radii (R) are as follows:<br>R1012 = .0250 inch (.635 mm); R1013 = .0150 inch (.381 mm); |
| Std. B Flute: | Flute/flat = 1.29:1; The Radii (R) are as follows:<br>R1014 = .0410 inch (1.041 mm); R1015 = .0310 inch (.7874 mm);<br>R1016 = .0310 inch (.7874 mm); |
| Std. C Flute: | Flute/flat = 1.46:1; The Radii (R) are as follows:<br>R1017 = .0720 inch (1.829 mm); R1018 = .0620 inch (1.575 mm); |
| Std. A Flute: | Flute/flat = 1.53:1; The Radii (R) are as follows:<br>R1019 = .0720 inch (1.829 mm); R1020 = .0620 inch (1.575 mm). | below in connection with FIG. 7. Techniques for conducting a process as characterized with respect to FIG. 4 are described in PCT WO 04/007054, published Jan. 22, 2004.

Still in reference to FIG. 4, before the z-filter media 74 is put through the darting station 71 and eventually slit at 75, it must be formed. In the schematic shown in FIG. 4, this is done by passing a sheet of media 92 through a pair of corrugation rollers 94, 95. In the schematic shown in FIG. 4, the sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64.

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 would typically be secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a. Of course the equipment of FIG. 4 can be modified to provide for the tack beads 20, if desired.

The type of corrugation provided to the corrugated media is a matter of choice, and, will be dictated by the corrugation or corrugation teeth of the corrugation rollers 94, 95. One useful corrugation pattern will be a regular curved wave pattern corrugation, of straight flutes, as defined herein above. A typical regular curved wave pattern used, would be one in which the distance D2, as defined above, in a corrugated pattern is at least 1.2 times the distance D1 as defined above. In example applications, typically D2=1.25-1.35×D1, although alternatives are possible. In some instances the techniques may be applied with curved wave patterns that are not "regular," including, for example, ones that do not use straight flutes. Also, variations from the curved wave patterns shown are possible. As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, and 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes. A third layer or portion 128 can also be seen pressed against the second layer or portion 124. The third layer 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054. Techniques for coiling the media, with application of the winding bead, are described in PCT application US 04/07927, filed Mar. 17, 2004.

Alternate approaches to darting the fluted ends closed are possible. Such approaches can involve, for example, darting which is not centered in each flute, and rolling or folding over the various flutes. In general, darting involves folding or otherwise manipulating media adjacent to fluted end, to accomplish a compressed, closed state. Techniques described herein are particularly well adapted for use in media packs that result from a step of coiling a single sheet comprising a corrugated sheet/facing sheet combination, i.e., a "single facer" strip.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application US 04/07927. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054 and PCT application US 04/07927. Another way of describing the peripheral or perimeter shape is by defining the perimeter resulting from taking a cross-section through the media pack in a direction orthogonal to the winding access of the coil.

Opposite flow ends or flow faces of the media pack can be provided with a variety of different definitions. In many arrangements, the ends are generally flat and perpendicular to one another. In other arrangements, the end faces include tapered, coiled, stepped portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Reference numeral 130, FIG. 6, generally indicates a coiled media pack 130. The coiled media pack 130 comprises a single strip 130a of single facer material comprising a fluted sheet secured to facing sheet coiled around a center, which can include a core, or which can be careless as illustrated. Typically, the coiling is with facing sheeting directed outwardly. As previously described, in general a single facer bead and winding bead would be used, to provide flute seals within the media. The particular coiled media pack 130 depicted comprises an oval media pack 131. It is noted that the principles described herein, however, can be applied starting with the media pack having a circular configuration.

In FIG. 7, schematically there is shown a step of forming a stacked z-filter media pack from strips of z-filter media, each strip being a fluted sheet secured to a facing sheet. Referring to FIG. 7, single facer strip 200 is being shown added to a stack 201 of strips 202 analogous to strip 200. Strip 200 can be cut from either of strips 76, 77, FIG. 4. At 205, FIG. 7, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 7, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b.

Still referring to FIG. 7, in the media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media pack 201 shown being formed in FIG. 7, is sometimes referred to herein as a "blocked" stacked media pack. The term "blocked" in this context, is an indication that the arrangement is formed to a rectangular block in which all faces are 90° relative to all adjoining wall faces. Alternate configurations are possible, as discussed below in connection with certain of the remaining figures. For example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces. In some instances, the media pack will be referenced as having a parallelogram shape in any cross-section, meaning that any two opposite side faces extend generally parallel to one another. A blocked, stacked arrangement corresponding to FIG. 7 is described in the prior art of U.S. Pat. No. 5,820,646. It is noted that a stacked arrangement shown in U.S. Ser. No. 10/731,504, is a slanted stacked arrangement.

A variety of filter media having upstream and downstream flow faces are contemplated and can be used in various implementations. Among those include a form of pleated media with flutes having defined peaks to reduce masking, such as those described in patent publication US 2010/0078379, incorporated herein by reference.

III. Example Air Filter Cartridge and Dust Collector

A. Example Air Filter Cartridges, FIGS. 8-14

Figure 8:
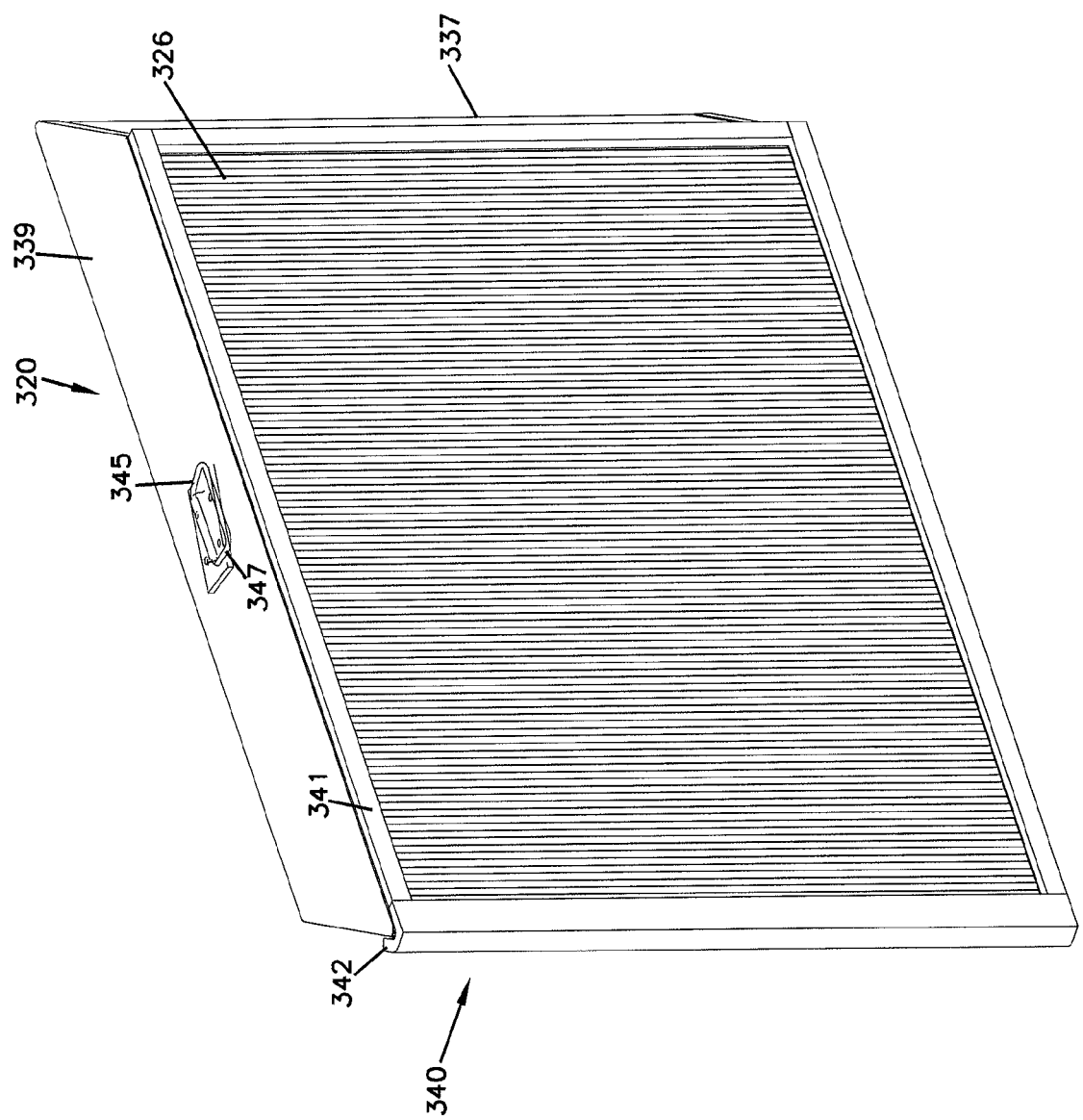
FIG. 8 is a perspective view of a first embodiment of an air filter cartridge utilizing a media pack having a stack of strips of single facer filter media, constructed in accordance with principles of this disclosure.

One embodiment of an air filter cartridge is depicted in FIG. 8 generally at 320. The air filter cartridge 320 includes a media pack 322. The media pack 322 can include many different types of filter media including, for example, pleated, pleated with defined peaks to reduce masking, or Z-media. In the example depicted, the media pack 322 is z-media having an upstream flow face 324 (FIG. 11) and an opposite downstream flow face 326. In the embodiment shown, the upstream flow face 324 and the downstream flow face 326 are generally flat, planar, and parallel to each other.

Figure 9:
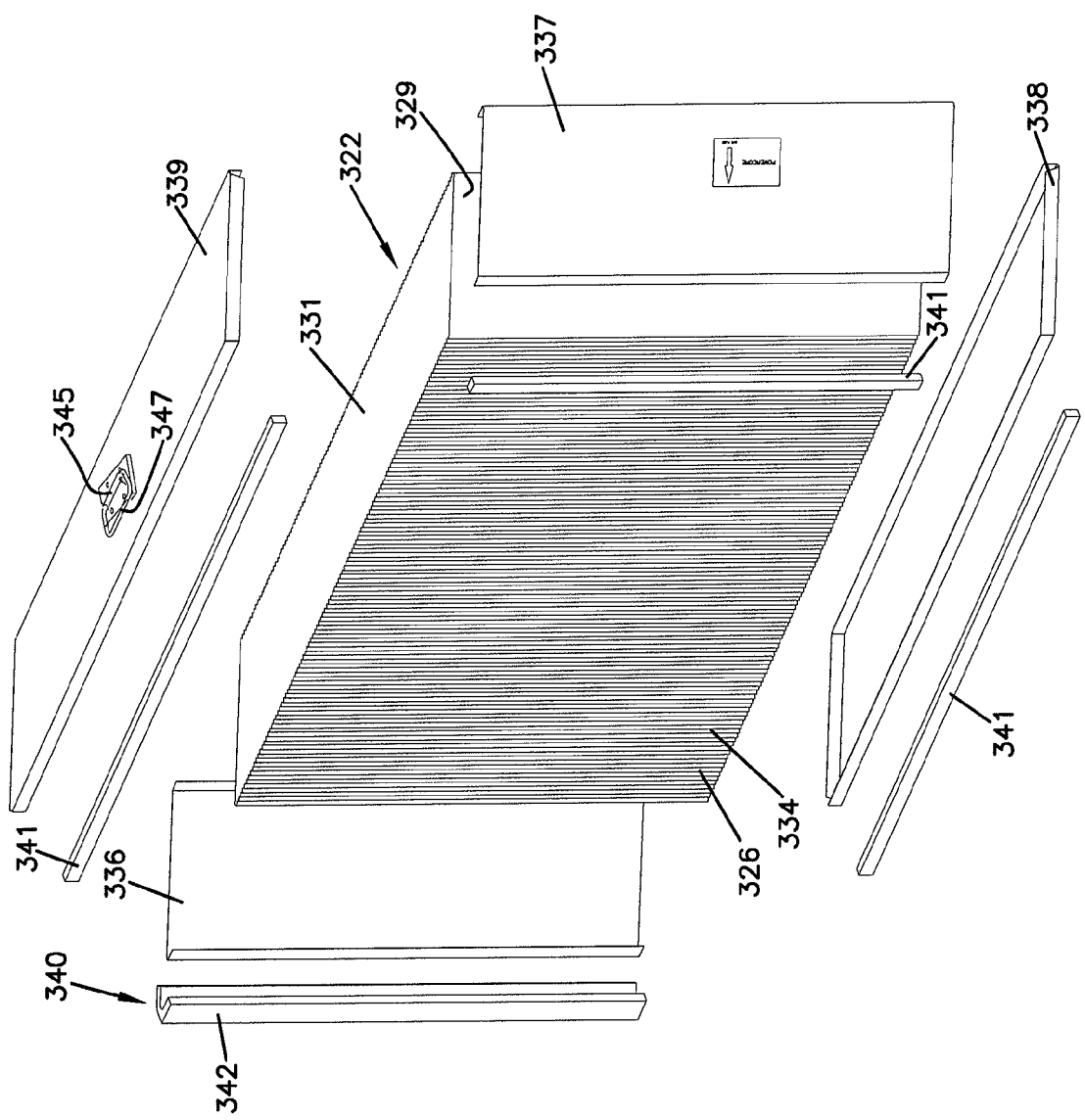
FIG. 9 is an exploded, perspective view of the air filter cartridge of FIG. 8.
Figure 12A:
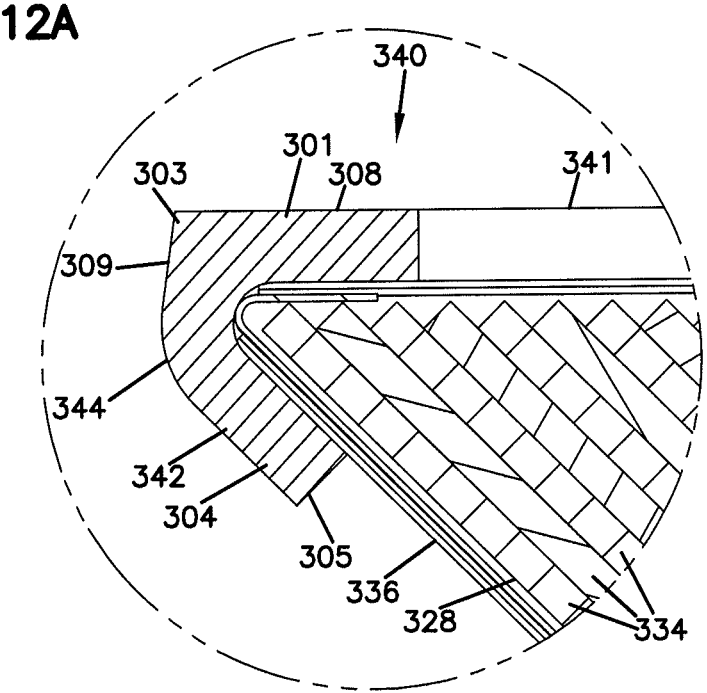
FIG. 12A is an enlarged view of a portion of the cross-section of FIG. 11.

The media pack 322 includes first and second opposite sides 328, 329 (FIG. 11) extending between the upstream and downstream flow faces 324, 326. The media pack 322 also includes third and fourth opposite sides 330, 331 (FIG. 9) extending between the upstream and downstream flow faces 324, 326. As can be seen in the embodiment of FIGS. 8-10 and as mentioned above, the upstream flow face 324 and downstream flow face 326 are parallel, in this embodiment. In this embodiment, each strip 334 of the media pack 322 is angled relative to a horizontal surface from the upstream flow face 324 to the downstream flow face 326 at an angle of 20-80 degrees, for example 30-60 degrees, and more particularly 40-50 degrees.

Still in reference to FIGS. 8-11, the air filter cartridge 320 pictured includes a first side panel 336 against the first side 328 of the media pack 322. The first side panel 336 is typically a rigid material to help protect the media pack 322. It can be a rigid plastic or it can be metal. The first side panel 336 is depicted as extending from the upstream flow face 324 to the downstream flow face 326. The first side panel 336 can be against the media pack 322 in a variety of ways. For example, the first side panel 336 can be a molded piece that is molded directly onto the media pack 322; or it can be a pre-made piece that is secured with adhesive or glue. Other attachment methods can be used.

In this embodiment, the air filter cartridge 320 further includes a second side panel 337 against the second side 329 of the media pack 322. In this embodiment, there is also a third side panel 338 against to the third side 330 of the media pack 322, and a fourth side panel 339 against the fourth side 331 of the media pack 322. The second side panel 337, third side panel 338, and fourth side panel 339 each help to protect the media pack 322. They can be pre-made pieces that are made of a rigid material and can include a rigid plastic or metal that are then secured by adhesive or glue; alternatively, they can be molded pieces that are directly molded to the media pack 322. In the embodiment depicted, each of the second side panel 337, third side panel 338, and fourth side panel 339 extend from the upstream flow face 324 to the downstream flow face 326.

In accordance with principles of this disclosure, the air filter cartridge 320 further includes a gasket arrangement 340. The gasket arrangement 340 is to create a seal with an appropriate sealing surface in whatever system the air filter cartridge 320 is being installed, such that the air to be filtered does not bypass the media pack 322.

In this embodiment, the gasket arrangement 340 includes a perimeter gasket member 341 and a side gasket member 342. The perimeter gasket member 341 is against the downstream flow face 326 and around the edge or perimeter of the downstream flow face 326. In the embodiment shown, the perimeter gasket member 341 forms a rectangular window 343, with the opening in the window exposing the downstream flow face 326.

In this embodiment, the side gasket member 342 is adjacent to at least a partial extension of the first side panel 336. By the term "partial extension" it is meant that the side gasket member 342 may only cover a part of the first side panel 336. By the term "adjacent to," it is meant it is next to the partial extension of the first side panel 336 at least when the cartridge 320 is operably installed for use in a dust collector. In the embodiment shown, the side gasket member 342 extends a distance of no greater than 40% of an overall length of the first side panel 336. In the particular embodiment shown, the side gasket member 342 is against the first side panel 336. It is shown to extend a distance of at least 5% and typically 10-30% of the overall length of the first side panel 336.

In this embodiment, the media pack 22 includes a stack of strips 34 of single facer filter media material, with each strip 34 including a fluted media sheet 3 (FIG. 1) secured to a facing media sheet 4 (FIG. 1) and oriented with flutes 7 (FIG. 1) of each fluted sheet extending in a direction between the upstream and downstream flow faces 24, 26.

In the embodiment shown, the side gasket member 342 is integral with the perimeter gasket member 341. By "integral," it is meant that the side gasket member 342 and perimeter gasket member 341 are adjacent to each other without a gap in between and can include two separate pieces attached or fitted together; it can also mean they are molded into one single unitary piece. This can be seen in FIG. 12A, such that the perimeter gasket member 341 wraps around to form the side gasket member 342, joining together at intersection 344.

In preferred implementations, the side gasket member 342 includes no portion adjacent or against the second side panel 337, the third side panel 338, and the fourth side panel 339 (i.e., the second side panel 337, third side panel 338, and fourth side panel 339 are "gasket-free"). That is, in preferred implementations, the side gasket member 342 is adjacent only to the first side panel 336.

When the side gasket member 342 is against the first side panel 336, it will be at the same angle that the side panel 336 is relative to the downstream flow face 326. In this embodiment, that angle will typically be 20-80 degrees, for example 30-60 degrees, and more particularly 45-50 degrees.

The gasket arrangement 340 can be constructed of typical materials used for gaskets, such as polyurethane foam, urethane, rubber, silicone, and any other typical gasket material.

The gasket arrangement 340 may be secured to a remaining portion of the cartridge 320 by a variety of techniques including, for example, adhesive or by directly molding the gasket arrangement 340 onto the remaining portion of the cartridge 320.

Figure 12B:
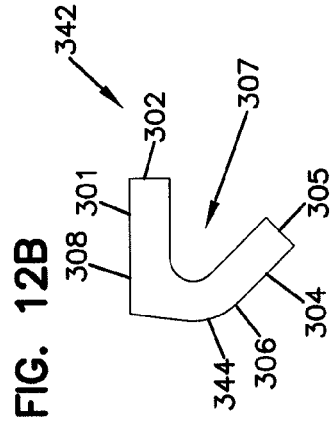
FIG. 12B is an enlarged view of a profile of the gasket used with the filter cartridge of FIGS. 8-11.
Figure 12C:
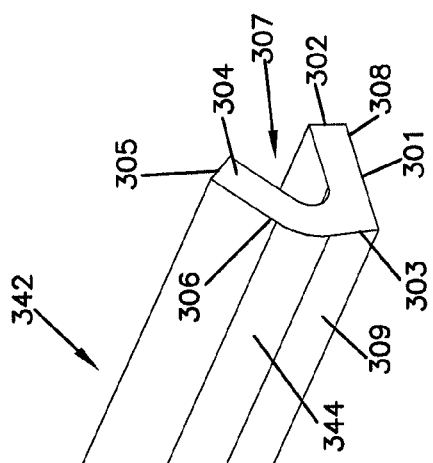
FIG. 12C is a perspective view of the gasket of FIG. 12B.

In reference now to FIGS. 12B and 12C, an enlarged view of one useable side gasket member 342 is depicted. In the embodiment shown, the side gasket member 342 includes a first gasket segment 301. First gasket segment 301 has a free end 302 and an opposite first end 303. The gasket 342 depicted further includes a second gasket segment 304 having a free end 305 and an opposite second end 306. Note that the second end 306 is the portion of the second gasket segment 304 where the straight segment stops and a curved section begins. This can be seen in FIG. 12C.

In the example embodiment shown, both the first gasket segment 301 and the second gasket segment 304 are straight. The second gasket segment 304 is angled relative to the first gasket segment 301 at an angle of between 20-70 degrees.

Intermediate gasket segment 344 joins the first end 303 of the first gasket segment 301 and the second end 306 of the second gasket segment 304. As can be seen in FIG. 12B, the first gasket segment 301, second gasket segment 304, and intermediate gasket segment 344 together define an open filter cartridge-receiving cavity 307 constructed and arranged to receive a remaining portion of the filter cartridge 320.

The first gasket segment 301 and the second gasket segment 304 are sized to create an appropriate seal when operably installed. In example embodiments, a ratio of a length of the first gasket segment 301 to the second gasket segment 304 is between 1-2.5. In this case, the length is measured between each of the segment's respective free end 302, 305 and the opposite end 303, 306. In one example embodiment, the ratio of the length of the first gasket segment 301 to the second gasket segment 304 is between 1.6-2.0.

Preferably, the first gasket segment 301 and second gasket segment 304 each has a thickness of between 0.35-0.40 inches. Of course, there may be variations. In one embodiment, the gasket 342 is made of a compressive material having a resistance of 3-5 psi at 25 percent compression. One useable material is EDPM sponge. Other materials that are useable include polyurethane, foamed polyurethane, rubber, and silicone, just to name a few examples. Many materials are useable.

Figure 16:
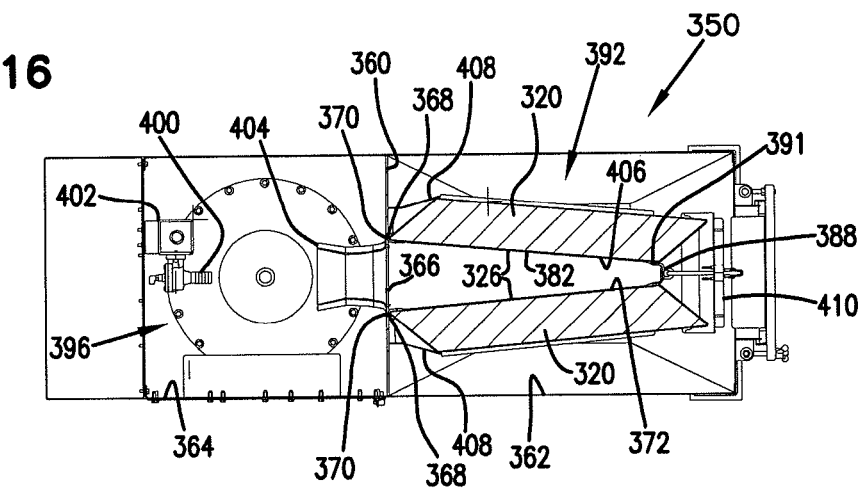
FIG. 16 is a cross-sectional view of the dust collector of FIG. 15, the cross-section being taken along the line 16-16 of FIG. 15.

In use, the gasket 342 creates a seals by compression between the side gasket member 342 and tubesheet 360 (FIG. 16). In particular, in preferred embodiments, the seal is created between the outer surface 308 of the first gasket segment 301 and the outer surface 309 of the first end 303 of the first gasket segment 301. Note that in the embodiment shown, surfaces 309 and 308 are generally orthogonal or perpendicular to each other.

In one example embodiment, the filter cartridge 320 includes at least one handle 345 to allow for handling and manipulation of the cartridge 320. In the embodiment illustrated, at least one handle 345 is secured, connected, or attached to one of the second side panel 337, third side panel 338, and fourth side panel 339. While a variety of embodiments are possible, this embodiment shown includes one handle 345 secured to fourth side panel 339 and a second handle 345 secured to the third side panel 338 (FIG. 10). The handles 345 are shown centered on the panels 338, 339. The handles 345 have a grasping ring 347, which is movable from against the panels 338, 339 to a position away from the panels 338, 339 so that they may be grasped by 4 fingers of a typical adult sized hand.

Figure 14:
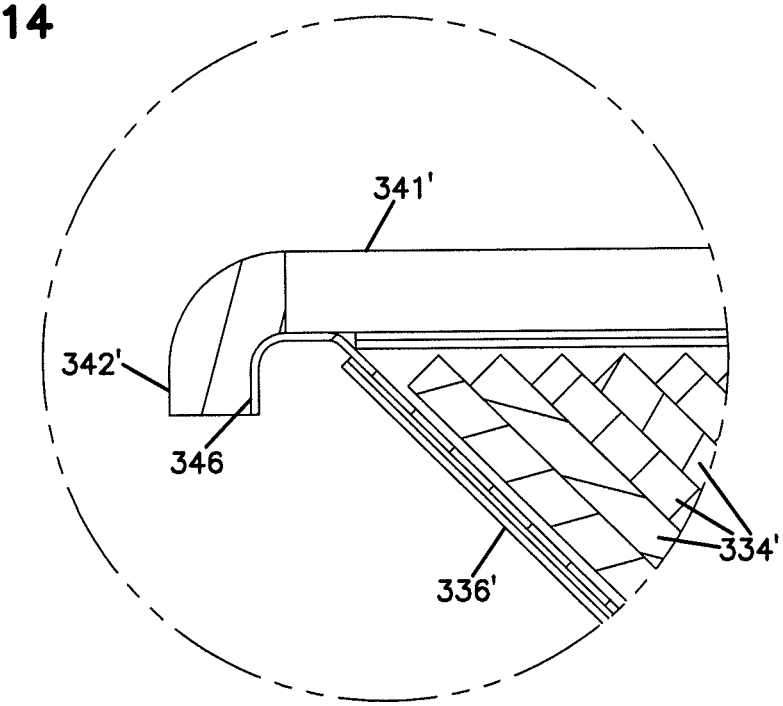
FIG. 14 is an enlarged view of a cross-section of a portion of the air filter cartridge of FIG. 12.
Figure 13:
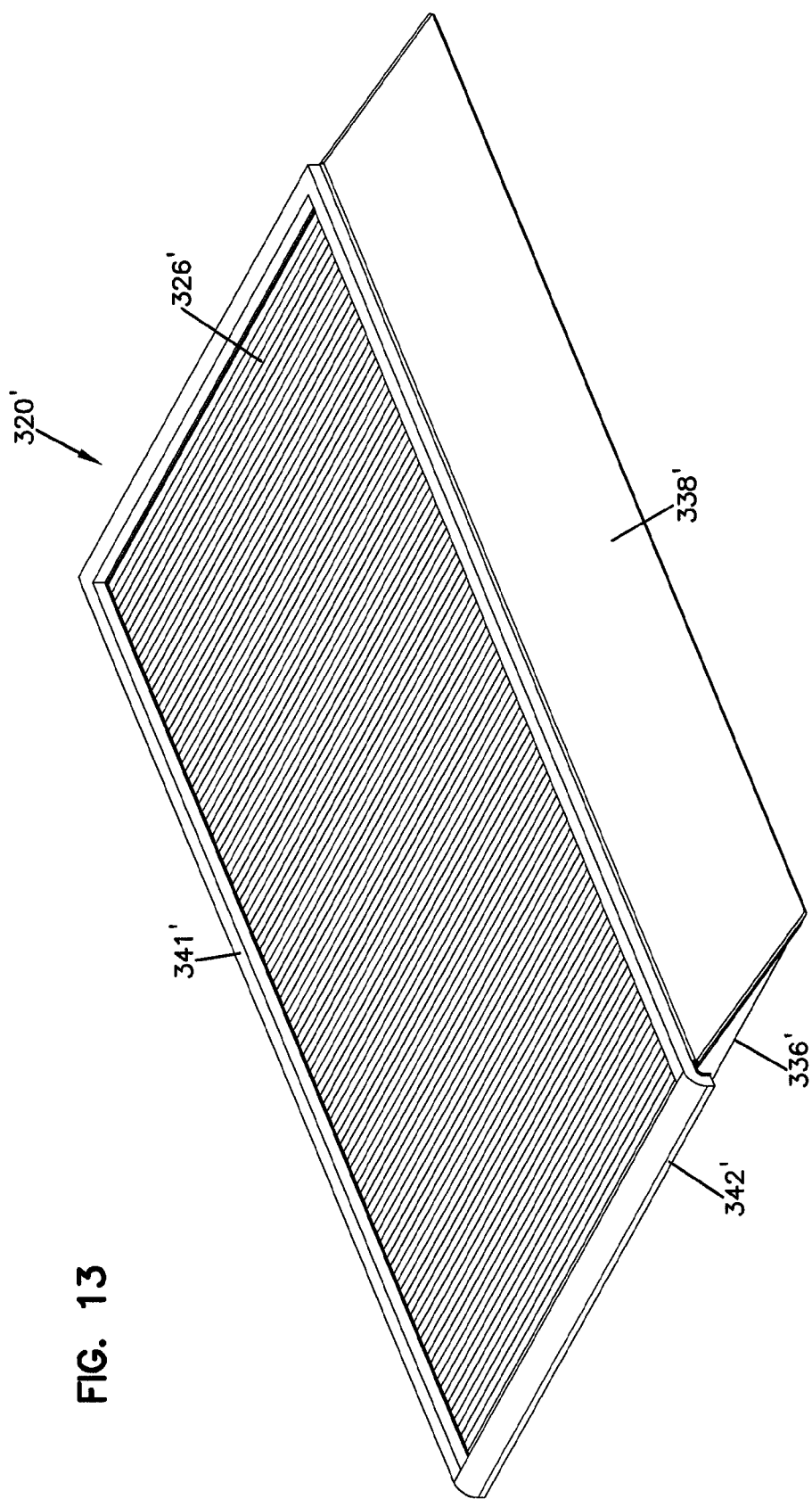
FIG. 13 is a perspective view of another embodiment of an air filter cartridge having a media pack comprising a stack of strips of single facer filter media material, constructed in accordance with principles of this disclosure.

In reference now to FIGS. 13 and 14, another embodiment of an air filter cartridge is depicted at 320'. The air filter cartridge 320' has the same features as the air filter cartridge 320, with the exception of the arrangement of the side gasket member 342'. In this embodiment, the air filter cartridge 320' includes a gasket mounting face 346 (FIG. 14) projecting from and spaced from a remaining portion of the air filter cartridge 320'. The gasket mounting face 346 is angled relative to a plane containing the perimeter gasket member 341'. The gasket mounting face 346 supports the side gasket member 342'.

Typically, the gasket mounting face 346 will be angled from 45 degrees to −180 degrees relative to the downstream flow face 326'. Many useful embodiments will include the gasket mounting face 346 to be angled from 30 degrees to −150 degrees relative to the downstream flow face 326'. As can be seen in FIG. 14, the side gasket member 342' is spaced from the first side panel 336'.

B. Example Dust Collector, FIGS. 15 and 16

Figure 15:
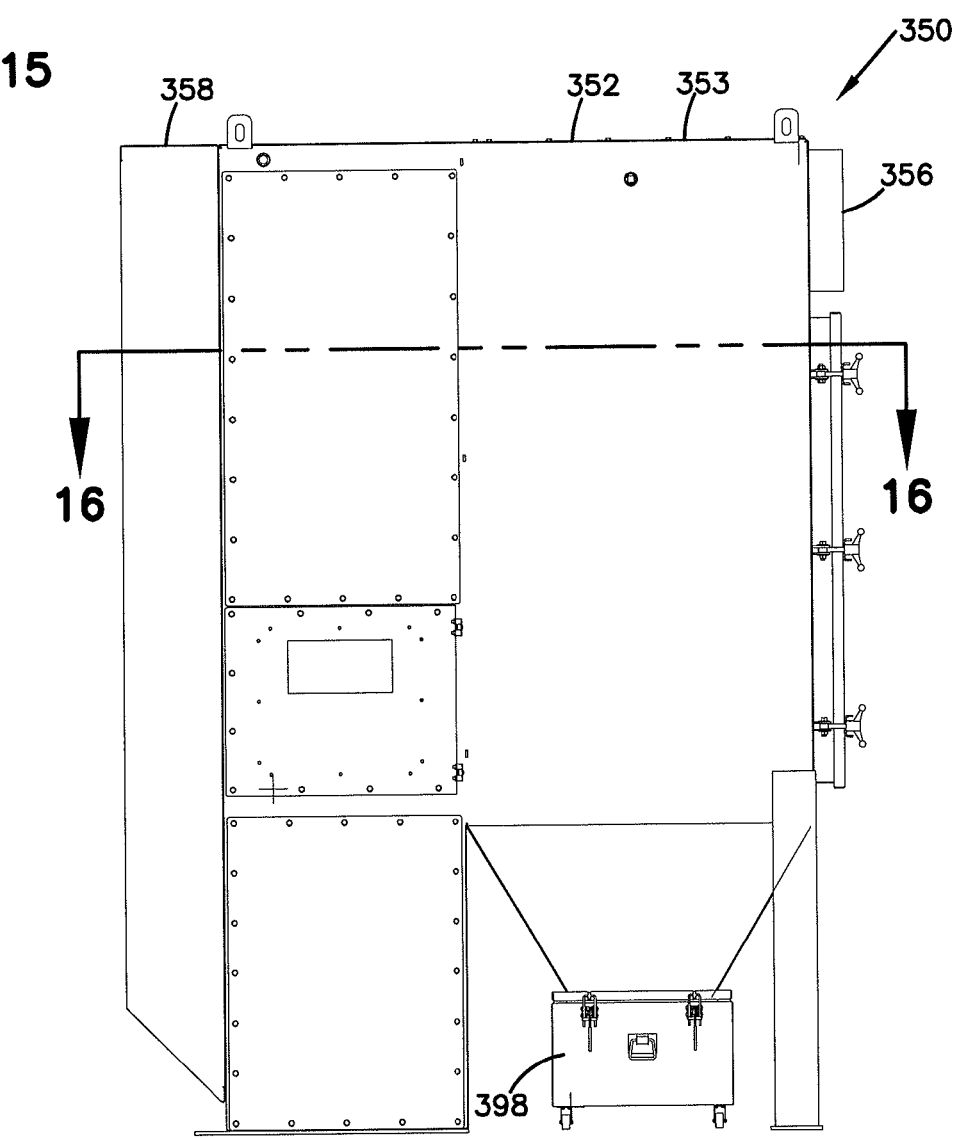
FIG. 15 is a front view of an embodiment of a dust collector utilizing air filter cartridges of the type shown in FIGS. 8-14, constructed in accordance with principles of this disclosure.

FIGS. 15 and 16 show an example embodiment of a dust collector 350 that utilizes filter cartridges of the type characterized above. The dust collector 350 is used for filtering air. For example, the dust collector 350 can be used for cleaning dust and other types of particulate from the air. In general, the dust collector 350 includes a housing 352. The housing 352 can be made from sheet metal or other types of rigid materials. The housing 352 forms an enclosure 353 with an interior volume 354.

The housing 352 has an unfiltered or dirty air inlet 356 and a filtered or clean air outlet 358. In general, unfiltered air enters the dust collector 350 through the dirty air inlet 356. Air filter cartridges 320 oriented within the dust collector 350 remove dust and other particulate from the air, and then the clean, filtered air is exhausted from the dust collector 350 through the clean air outlet 358.

The dust collector 350 further includes a tubesheet 360. The tubesheet 360 functions as a wall that separates the interior volume 354 of the housing 352 between an unfiltered air plenum 362 and a filtered air plenum 364. The tubesheet 360 has a plurality of holes or apertures 366 therethrough. The apertures 366 are for allowing filtered air to flow from the downstream flow face 326 of the air filter cartridges 320 through the tubesheet 360, into the filtered air plenum 364, and then out through the clean air outlet 358.

The tubesheet 360 defines a sealing surface 368. The sealing surface 368 is located on the side of the tubesheet 360 in the unfiltered plenum 362. In the embodiment shown, the sealing surface 368 is adjacent to the apertures 366. The sealing surface 368 forms a seal 370 (FIG. 16) between and against the tubesheet 360 and the air filter cartridge 320. In particular, the seal 370 is formed between and against the sealing surface 368 of the tubesheet 360 and the side gasket member 342 of the air filter cartridge 320.

The housing 352 further includes a frame arrangement 372. The frame arrangement 372 extends from the tubesheet 360. The frame arrangement 372 helps to hold and support the air filter cartridges 320 in the dust collector 352. The frame arrangement 372 includes a surface which forms a seal with the gasket arrangement 340 of the air filter cartridge 320. In particular, a seal 382 (FIG. 16) is formed between and against the frame arrangement 372 and the perimeter gasket member 341 of the air filter cartridge 320.

In this embodiment, the frame arrangement 372 further includes a bar 388 spaced from the tubesheet 360. The bar 388 has a sealing surface that forms a seal 391 (FIG. 16) with the perimeter gasket member 341 of the gasket arrangement 340 of the air filter cartridge 320.

In general, the bar 388 runs parallel to the tubesheet 360. The air filter cartridges 320 are operably installed between the bar 388 and the tubesheet 360, with assistance in supporting the filter cartridges 320 in place by use of the trays 374.

In the embodiment shown, the air filter cartridges 320 are installed in the dust collector 350 in filter pairs 392. Each filter element pair 392 includes first and second air filter cartridges 320 being oriented in the housing 352 horizontally adjacent to each other and generally angled in a direction outwardly as they extend from the bar 388 to the tubesheet 360. As can be seen in FIG. 16, the bar 388 is located between each air filter cartridge 320 in the filter pair 392. As can also be seen in FIG. 16, the air gap or volume 406 between the respective downstream sides 326 of the two air filter cartridges 320 increases as the distance increases from the bar 388 to the tubesheet 360. This forms a type of V-filter arrangement.

The dust collector 350 further includes a reverse pulse cleaning arrangement 396. The reverse pulse cleaning arrangement 396 is constructed and arranged to emit a pulse of air from the filtered air plenum 364, through the downstream flow faces 326 of each of the air filter cartridges 320. By pulsing air from the clean air side through the downstream flow faces 326, dust and other debris clogging the upstream flow faces 324 of the air filter cartridges 320 are dislodged and knocked loose from the air filter cartridge 320. From there, the dust and debris falls by gravity into a dust collection hopper 398 located below the arrangement of cartridges 320. The reverse pulse cleaning arrangement 396 includes, preferably, at least one nozzle 400 for each aperture 366 in the tubesheet 360. The nozzles 400 are in air flow communication with a manifold 402, which is connected to a source of pressurized air. The reverse pulse cleaning arrangement 396 periodically sends a pulse air through the manifold 402 to the nozzles 400. The pulse of air leaves each nozzle 402 and flows through the apertures 366. From there, the air flows in a reverse direction through the normal direction of air flow through the air filter cartridges 320.

In the preferred embodiment shown, each of the apertures 366 includes a venturi 404 to help direct the pulse of air from the nozzle 400 through the apertures 366, and into the volume 406 (FIG. 16) between the downstream flow faces 326 of opposing filter cartridges 320 in each filter element pair 392. The venturi 404 circumscribes each respective aperture 366 and helps to ensure that the air pulse is evenly directed into the volume 406.

The dust collector 350 further includes a guide ramp 408. The guide ramp 408 projects from the tubesheet 360 and is adjacent to the tubesheet sealing surface 368. The ramp 408 is constructed and arranged to orient each of the air filter cartridges 320 in sealing engagement against the tubesheet sealing surface 368. As can be seen in FIG. 15, the ramp 408 is angled from the tubesheet 360, in a direction that is generally non-coplanar and non-orthogonally with respect to the tubesheet 360. In practice, as each filter cartridge 320 is installed in the dust collector housing 352, the end of the air filter cartridge 320 nearest to the tubesheet 360 engages the ramp 408. The ramp 408 helps to slide and guide the air filter cartridge 320 into place with the side gasket member 342 engaging and abutting against the sealing surface 368 of the tubesheet 360. In the embodiment shown, there are a pair of guide ramps 408, one guide ramp 408 for each side of the filter pairs 392. That is, there is one guide ramp 408 on lateral sides of the tubesheet 360 with the apertures 366 between the ramps 408.

The dust collector 350 further includes a clamp arrangement 410. The clamp arrangement 410 is for operably securing the filter element pairs 392 in sealing engagement with the tubesheet 360 and the frame arrangement 372.

It should be understood how each air filter cartridge 320 operably fits within the housing 352. The end of the air filter cartridge 320 will engage the guide ramp 408, which will help to guide and direct the cartridge 320 into sealing engagement against the tubesheet 360. The side gasket member 342 will engage against the sealing surface 368 of the tubesheet 360. At the same time, the perimeter gasket member 341 will engage against the sealing surface of the frame arrangement 372 and the sealing surface of the bar 388. The clamp arrangement 410 will be oriented over the ends of a filter element pair 392 and engaged, pushing the filter element pair 392 against the tubesheet 360. This helps to form the seal 370, 382, and 391.

In use, dirty air is directed through the dirty air inlet 356 into the unfiltered air plenum 362 of the housing 352. The dirty air is then directed through the upstream flow faces 324 of the media pack 322 of a first air filter cartridge 320. In this embodiment, the dirty air would be directed through the upstream flow face 324 of each filter element pair 392. Dirty air is prevented from bypassing the air filter cartridge 320 by the perimeter gasket member 341 and the side gasket member 342, which both form seals 382, 370 with the housing 352. During use, the air filter cartridges 320 will be periodically back flushed of dust and debris by pulsing of the reverse pulse cleaning arrangement 396. This will send jets of air through the downstream flow face 326 and through the upstream flow face 324. This will help to knock built up dust and debris from the media pack 322. This dust and debris will fall by gravity into the hopper 398.

After a period of use, the air filter cartridges will need replacement. Each air filter cartridge 320 of each filter element pair 392 is removed from the housing 352. The old filter cartridge 320 is recycled, incinerated, or otherwise discarded. A new filter cartridge 320 is then provided and installed.

The above provides examples of principles of the invention. Many embodiments can be made using these principles. It is noted that not all the specific features described herein need to be incorporated in an arrangement for the arrangement to have some selected advantage according to the present disclosure.

I claim:

1. An air filter cartridge comprising:
   (a) a media pack having upstream and downstream opposite flow faces, first and second opposite sides extending between the upstream and downstream opposite flow faces, and third and fourth opposite sides extending between the upstream and downstream opposite flow faces; the media pack comprises a stack of strips of single facer filter media material, each strip including a fluted media sheet secured to a facing media sheet and oriented with flutes of each fluted sheet extending in a direction between the upstream and downstream flow faces;
   (b) a first side panel against the first side of the media pack;
   (c) a second side panel against the second side of the media pack;
   (d) a third side panel against the third side of the media pack;
   (e) a fourth side panel against the fourth side of the media pack; and
   (f) a gasket arrangement including:
      (i) a perimeter gasket member against the downstream flow face and around a perimeter of the downstream flow face; and
      (ii) a side gasket member, adjacent to at least a partial extension of the first side panel; the side gasket member including no portion against the second, third, and fourth side panel;
         (A) the side gasket member extends against the first side panel from the downstream flow face a distance no greater than 40% of an overall length of the first side panel; and
   (g) a handle secured to the cartridge.

2. An air filter cartridge according to claim 1 wherein the side gasket member is angled relative to the downstream flow face at an angle of 20-80 degrees.

3. An air filter cartridge according to claim 1 wherein the side gasket member includes at least the portion adjacent to the first side panel and an intermediate segment bridging the first side panel and the downstream flow face.

4. An air filter cartridge according to claim 1 wherein the side gasket member includes a segment against the downstream flow face.

5. An air filter cartridge according to claim 1 wherein the side gasket member is angled relative to the downstream flow face at an angle of 30-60 degrees.

6. An air filter cartridge according to claim 1 wherein the side gasket is made of a compressive material having a resistance of 3-5 psi at 25% compression.

7. An air filter cartridge of claim 1 wherein:
   (a) the side gasket member and perimeter gasket member are adjacent to each other without a gap in between and includes two separate pieces attached or fitted together.

8. An air filter cartridge of claim 1 wherein:
   (a) the side gasket member and perimeter gasket member are molded into one single unitary piece.

9. An air filter cartridge comprising:
   (a) a filter media pack having upstream and downstream opposite flow faces and first and second opposite sides extending between the upstream and downstream opposite flow faces;
      (i) the filter media pack comprises a stack of strips of single facer filter media material, each strip including a fluted media sheet secured to a facing media sheet and oriented with flutes of each fluted sheet extending in a direction between the upstream and downstream flow faces;
   (b) a first side panel against the first side of the media pack; and
   (c) a gasket arrangement including:
      (i) a perimeter gasket member against the downstream flow face and around a perimeter of the downstream flow face; and
      (ii) a side gasket member adjacent to at least a partial extension of the first side panel; the side gasket member being angled relative the downstream flow face at an angle of 20-80 degrees.

10. An air filter cartridge according to claim 9 wherein the upstream flow face and downstream flow face are parallel, flat, and planar.

11. An air filter cartridge according to claim 9 wherein the side gasket member is angled relative to the downstream flow face at an angle of 30-60 degrees.

12. An air filter cartridge according to claim 9 wherein each strip of the media pack is angled relative to a horizontal surface from the upstream flow face to the downstream flow face at an angle of 20-80 degrees.

13. An air filter cartridge of claim 9 wherein:
   (a) the media pack further includes third and fourth opposite sides extending between the upstream and downstream opposite flow faces; and
   (b) the air filter cartridge further includes:
      a second side panel against the second side of the media pack;
      (ii) a third side panel against the third side of the media pack; and
      (iii) a fourth side panel against the fourth side of the media pack.

14. An air filter cartridge of claim 13 wherein:
   (a) the side gasket member includes no portion against the second, third, and fourth side panel.

15. An air filter cartridge of claim 9 wherein:
   (a) the side gasket member extends against the first side panel from the downstream flow face a distance no greater than 40% of an overall length of the first side panel.

16. An air filter cartridge according to claim 9 wherein the side gasket member includes at least the portion adjacent to the first side panel and an intermediate segment bridging the first side panel and the downstream flow face.

17. An air filter cartridge according to claim 9 wherein the side gasket member includes a segment against the downstream flow face.

18. An air filter cartridge of claim 9 further comprising:
(a) a handle (345) secured to a portion of the cartridge.

19. An air filter cartridge of claim 9 wherein the side gasket member comprises polyurethane foam material.

* * * * *